(12) United States Patent
Ahn et al.

(10) Patent No.: US 9,415,813 B2
(45) Date of Patent: Aug. 16, 2016

(54) FOLDABLE VEHICLE

(71) Applicant: Hyundai Motor Company, Seoul (KR)

(72) Inventors: Gwang Hyun Ahn, Whasung-Si (KR); Yong Woo Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/550,964

(22) Filed: Nov. 22, 2014

(65) Prior Publication Data
US 2016/0009320 A1 Jan. 14, 2016

(30) Foreign Application Priority Data

Jul. 9, 2014 (KR) ........................ 10-2014-0085866

(51) Int. Cl.
*B62B 1/00* (2006.01)
*B62D 31/00* (2006.01)
*B62D 21/14* (2006.01)
*B60J 7/14* (2006.01)
*B60J 1/04* (2006.01)

(52) U.S. Cl.
CPC ................. *B62D 31/006* (2013.01); *B60J 1/04* (2013.01); *B60J 7/143* (2013.01); *B62D 21/14* (2013.01)

(58) Field of Classification Search
CPC .... B62D 31/006; B62D 47/003; B62D 25/20; B62D 25/2009; B62D 25/2018; B62D 25/2027; B62D 25/08; B62D 21/14; B60J 1/04; B60J 1/02; B60J 7/00; B60J 7/02; B60J 7/12; B60J 7/143
See application file for complete search history.

(56) References Cited

U.S. PATENT DOCUMENTS

| 2,488,123 | A | * | 11/1949 | Hartry | ................. | B62D 31/006 180/209 |
| 3,700,057 | A | * | 10/1972 | Boyd | ..................... | B60F 5/003 180/308 |
| 3,850,472 | A | * | 11/1974 | Greppi | ................. | B62D 31/006 180/208 |
| 4,089,542 | A | * | 5/1978 | Westerman | ............. | B60F 5/006 180/208 |
| 4,340,124 | A | * | 7/1982 | Leonard | ............... | B62D 31/006 180/208 |
| 6,416,108 | B1 | * | 7/2002 | Elswick | ..................... | B60J 1/04 296/210 |

(Continued)

FOREIGN PATENT DOCUMENTS

| EP | 2 644 046 A2 | 10/2013 |
| JP | 2005-231415 A | 9/2005 |

(Continued)

*Primary Examiner* — James M Dolak
(74) *Attorney, Agent, or Firm* — Morgan, Lewis & Bockius LLP

(57) ABSTRACT

A foldable vehicle may include a front floor coupled with front wheels and a rear floor coupled with rear wheels, wherein the front floor and the rear floor increase or decrease a wheelbase of the vehicle by sliding over and under each other, a windshield part hinged to the front floor to turn forward or backward, a rear cabin part hinged to the floor part to turn forward or backward, and a roof part hinged to an upper end of the windshield part and hinged to an upper end of the rear cabin part, wherein the roof part may be configured to be stowed inside the vehicle when the windshield part and the rear cabin part may be folded inward, and may be configured to be exposed to the outside to form a roof of the vehicle when the windshield part and the rear cabin part may be unfolded outward.

26 Claims, 6 Drawing Sheets

(56) References Cited

U.S. PATENT DOCUMENTS

| | | | | |
|---|---|---|---|---|
| 7,007,975 | B2 * | 3/2006 | Taylor | B62K 15/006 180/208 |
| 8,627,910 | B1 * | 1/2014 | Carque | B62K 15/00 180/208 |
| 8,894,088 | B2 * | 11/2014 | Lark, Jr. | B62D 31/006 280/639 |
| 8,899,364 | B1 * | 12/2014 | Al Qanaei | B60G 3/06 180/89.1 |
| 9,199,671 | B1 * | 12/2015 | Ahn | B62D 21/14 |
| 9,199,672 | B1 * | 12/2015 | Ahn | B62D 31/006 |
| 9,216,776 | B2 * | 12/2015 | Suh | B62D 31/006 |
| 2013/0240274 | A1 | 9/2013 | Vitale et al. | |

FOREIGN PATENT DOCUMENTS

| | | |
|---|---|---|
| JP | 2012-153284 A | 8/2012 |
| JP | 2013-112096 A | 6/2013 |
| KR | 10-2014-0028725 A | 3/2014 |
| KR | 10-2014-0028726 A | 3/2014 |
| KR | 10-2014-0029836 A | 3/2014 |
| WO | WO 2013/125042 A1 | 8/2013 |

\* cited by examiner

FOLDABLE VEHICLE

CROSS REFERENCE TO RELATED APPLICATION

The present application claims priority of Korean Patent Application Number 10-2014-0085866 filed on Jul. 9, 2014, the entire contents of which application are incorporated herein for all purposes by this reference.

BACKGROUND OF THE INVENTION

1. Field of the Invention

The present invention relates, in general, to a new-concept foldable vehicle that occupies a minimum space by folding when parking and can be converted into a complete vehicle when it unfolds.

2. Description of Related Art

Recently, mini concept vehicles especially for one person have started begun emerging into the market with the advent of hybrid electric vehicles.

Such vehicles are designed to be capable of folding/unfolding to occupy a minimum space when parking for a long period of time.

However, the existing foldable vehicles occupy large spaces, even if they are folded, because it is difficult to change their wheelbases, and the overall length cannot be minimized because the roof or the rear side cannot be fully folded. In particular, even if their roof or rear side can fold, the overall height increases instead, when they fold, so it is difficult to park the vehicles in a parking space with a small height and their external appearances are unnatural.

Therefore, there has been a need of a foldable structure for reducing the wheelbase as much as possible and fully folding the roof and the rear of a vehicle without increasing the overall height.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a new-concept foldable vehicle that occupies a minimum space by folding when parking and can be converted into a complete vehicle when it unfolds.

In an aspect of the present invention, a foldable vehicle may include a floor part including a front floor coupled with front wheels and a rear floor coupled with rear wheels, wherein the front floor and the rear floor increase or decrease a wheelbase of the vehicle by sliding over and under each other, a windshield part including a windshield and having a lower end hinged to a front of the front floor to turn forward or backward, a rear cabin part formed in a dome shape with a passenger compartment at a rear of the vehicle and having a lower end hinged to the floor part to turn forward or backward, and a roof part that is a link structure with a front end hinged to an upper end of the windshield part and a rear end hinged to an upper end of the rear cabin part, wherein the roof part is configured to be stowed inside the vehicle when the windshield part and the rear cabin part are folded inward, and is configured to be exposed to the outside to form a roof of the vehicle when the windshield part and the rear cabin part are unfolded outward.

The foldable vehicle may further include a front actuator engaged to the windshield part to turn the windshield part forward or backward.

The front actuator is a linear actuator having a lower end coupled to the front floor and an upper end coupled to the windshield part and turning the windshield part by pulling or pushing the windshield part.

When the windshield part is folded, the windshield part and the roof part are folded at an acute angle with a joint of the windshield part and the roof part facing the rear cabin part.

The foldable vehicle may further include a rear actuator engaged to the rear cabin part and turning the rear cabin part forward or backward.

The foldable vehicle may further include a rear wheel driving unit operating the rear wheels so that the rear floor slides forward under the front floor to shorten the wheelbase, as the vehicle is folded.

The foldable vehicle may further include a front actuator engaged to the windshield part and turning the windshield part forward or backward, a rear actuator engaged to the rear cabin part and turning the rear cabin part forward or backward, and a rear wheel driving unit operating the rear wheels so that the rear floor slides forward under the front floor to shorten the wheel base, as the vehicle is folded, wherein when the vehicle is folded, the front actuator is operated first to pull the windshield part and the roof part down inside the vehicle and then the rear actuator and the rear wheel driving unit are operated to fold the windshield part and the roof part.

When the rear actuator is operated, the windshield part and the roof part are inserted into the passenger compartment inside the rear cabin part.

The rear actuator and the rear wheel driving unit are simultaneously operated, such that the wheelbase is shortened and the windshield part and the roof part are fully inserted inside the rear cabin part.

The rear cabin part fully covers the inside of the vehicle in folding by coming in contact with a rear end of a hood of the vehicle.

The rear cabin part may have a shield covering the passenger compartment, a first contact portion coming in close contact with the rear end of the hood, when the vehicle is folded, and a second contact portion coming in close contact with the floor part, when the vehicle is folded.

When the vehicle that may have been folded is unfolded, the rear actuator and the rear wheel driving unit are operated first to turn the rear cabin part backward so that the wheelbase increases, and then the front actuator is operated to unfold the windshield part and the roof part outward.

The rear cabin part is coupled to the front floor through a hinge shaft, a support portion is formed on the front floor, close to the hinge shaft, and a stopper coming in contact with the support portion is formed on the hinge shaft of the rear cabin part.

The support portion is formed ahead of and behind the hinge shaft, on the front floor.

The stoppers protrude forward and backward from the hinge shaft.

When the vehicle is unfolded, the rear cabin part is supported on the front floor with a rear support portion and the rear stopper being in contact with each other, and when the vehicle is folded, the rear cabin part is supported on the front floor with a front support portion and the front stopper being in contact with each other.

In a rear cabin support unit of the above-mentioned foldable vehicle, a ring-shaped bearing member is fitted on the hinge shaft, a seat where the bearing member is seated is formed between support portions, and the stoppers protrude outward on the bearing member.

A support panel is formed on a bottom of the rear cabin part, behind the hinge shaft, and a support, which supports the support panel, when the rear cabin part turns backward, is formed on the floor part.

The support panel may have a support side coming in contact with the support, and bridges connecting the support side to the hinge shaft.

The support protrudes upward from the rear floor and may have an inclined top that is brought in contact with the support panel, when the rear cabin part is unfolded.

Female holders are disposed at a front end and a rear end of the front floor, respectively, and male holders, which are locked to the female holders, when the wheelbase increases or decreases, are disposed on the rear floor.

The front female holder is disposed at a front end of a first side of the front floor and coupled to one of the male holders, when the wheelbase decreases.

The rear female holder is disposed at a rear end of a second side of the front floor and coupled to another of the male holders, when the wheelbase decreases.

The male holders are disposed on both sides of the rear floor, respectively, at a predetermined distance from each other in a longitudinal direction of the vehicle.

Sliding guides coupled to the front floor are disposed on the rear floor, between the male holders.

The sliding guides protrude upward on the rear floor and sliding rails fitted on the sliding guide are disposed on the bottom of the front floor.

According to the foldable vehicle of the present invention described above, at the maximum, four vehicles can be parked in a space where one vehicle can be parked, so the optimum effect can be achieved in a downtown area.

Further, since local folding is possible within a narrow space, the wheelbase is shortened and the turning radius is decreased, so driving is easy.

In addition, the overall height is small, when the vehicle is parked, so the vehicle can be sufficiently parked in a space with a low vertical allowance.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
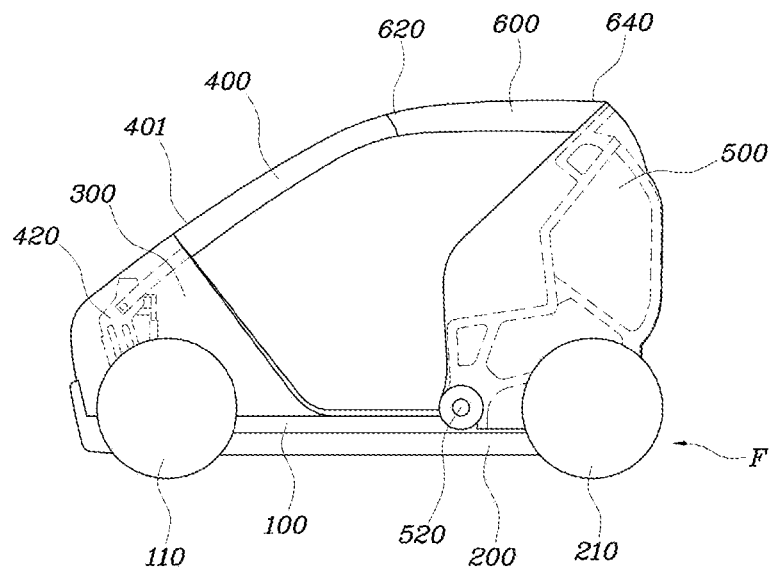
FIG. 1, FIG. 2, FIG. 3 and FIG. 4 are views showing the entire operation process of a foldable vehicle according to an exemplary embodiment of the present invention.
Figure 2:
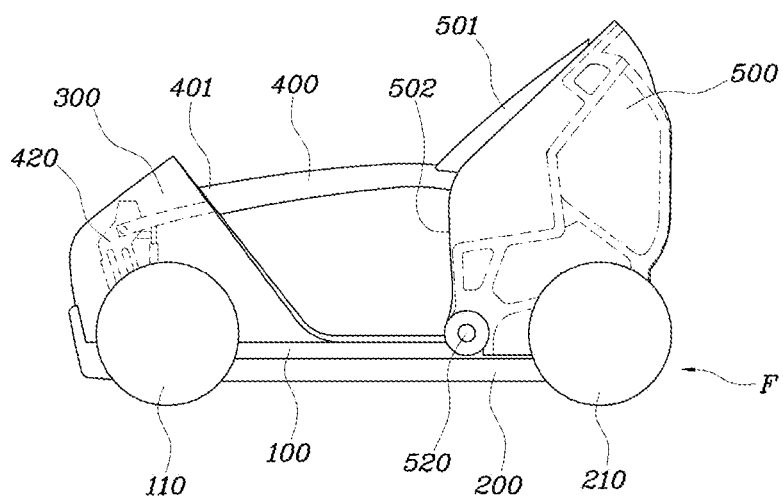

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinbelow, exemplary embodiments of the present invention will be described in detail with reference to the accompanying drawings.

Figure 3:
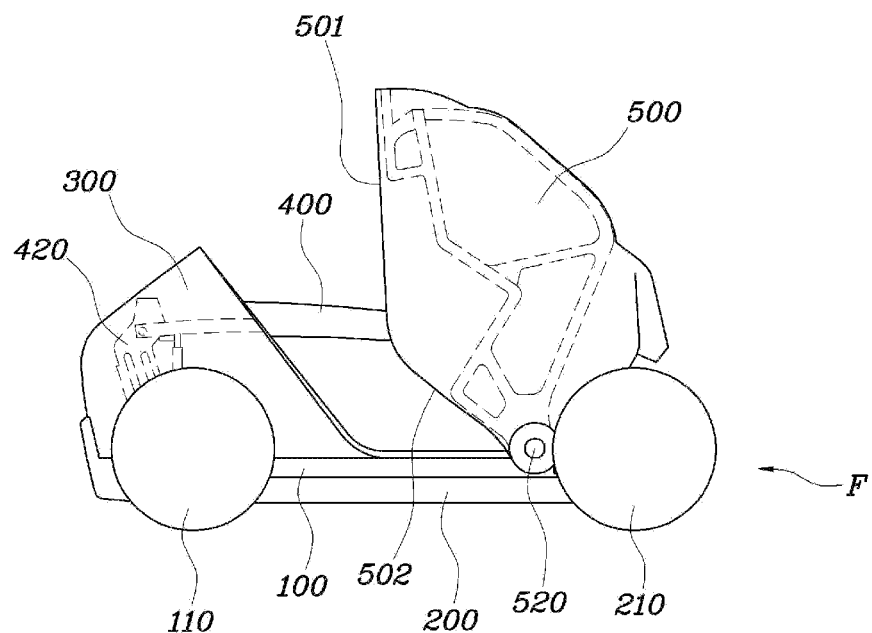
Figure 4:
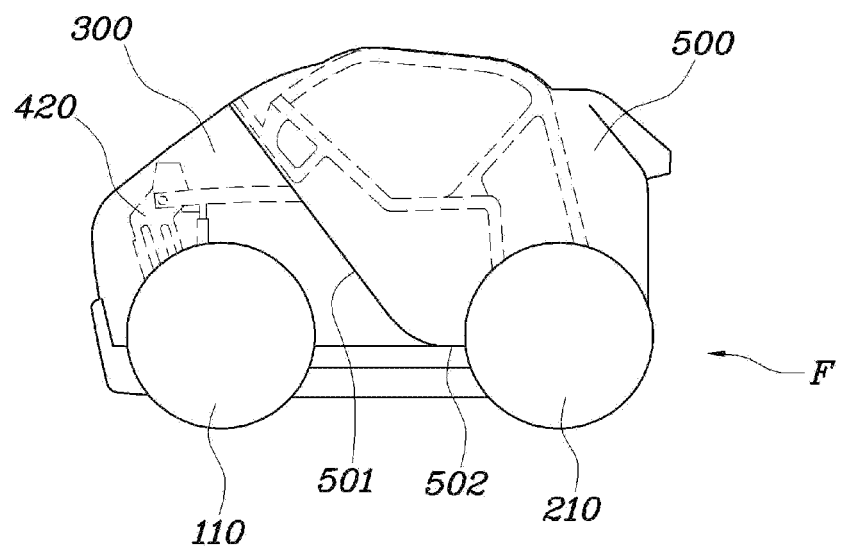
Figure 5:
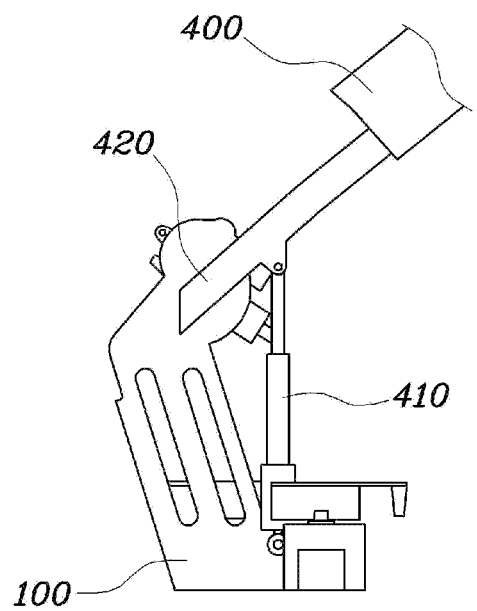
FIG. 5 is a view showing the operation structure of a windshield part of the foldable vehicle according to an exemplary embodiment of the present invention.

FIGS. 1 to 4 are views showing the entire operation process of a foldable vehicle according to an exemplary embodiment of the present invention and FIG. 5 is a view showing the operation structure of a windshield part of the foldable vehicle according to an exemplary embodiment of the present invention.

A foldable vehicle according to an exemplary embodiment of the present invention includes: a floor part F that includes a front floor 100 coupled with front wheels 110 and a rear floor 200 coupled with rear wheels 210 and increases or decreases the wheelbase of the vehicle by means of the front floor 100 and the rear floor 200 sliding over and under each other to extend or retract, a windshield part 400 that includes a windshield 401 and has a lower end 420 hinged to the front of the front floor 100 to turn forward/backward, a rear cabin part 500 that is formed in a dome shape with a passenger compartment at the rear of the vehicle and has a lower end hinged to the floor part F to turn forward/backward, and a roof part 600 that is a link structure with the front end hinged to the upper end of the windshield part 400 and the rear end hinged to the upper end of the rear cabin part 500 and that is stowed inside the vehicle when the windshield part 400 and the rear cabin part 500 are folded inward, and is exposed to the outside to form the roof of the vehicle when the windshield part 400 and the rear cabin part 500 are unfolded outward.

The front part F includes the front floor 100 coupled with the front wheels 110 and the rear floor 200 coupled with the rear wheels 210. The front floor 100 and the rear floor 200 slide over and under each other, so the wheelbase of the vehicle increases or decreases.

The windshield glass 401 is disposed above the front floor 100, similar to common vehicles. The windshield glass 401 is disposed on the windshield part 400 and the windshield part 400 has the lower end hinged to the front of the front floor 100 to turn forward/backward. Accordingly, when the vehicle is folded, the windshield is folded backward, and when the vehicle is unfolded, the windshield is unfolded forward to allow the vehicle to be driven.

The rear cabin part 500, which is formed in a dome shape with a passenger compartment at the rear of the vehicle, has the lower end hinged to the front floor 100 or the rear floor of the floor part F to turn forward/backward. It is assumed in the following embodiment that the rear cabin part 500 is coupled to the rear end of the front floor 100.

Further, there is provided the roof part 600 that is a link structure with the front end hinted to the upper end of the windshield part 400 and the lower end hinged to the upper end of the rear cabin part 500. The roof part 600 is folded with the windshield part 400 and defines the inside of the rear cabin part 500. When the rear cabin part 500 is folded inward, the windshield 400 and the roof part 600 are positioned inside the vehicle, that is, inside the rear cabin part 500, and when the windshield part 400 and the rear cabin part 500 are unfolded outward, the roof part 600 is exposed to the outside accordingly and forms the roof of the vehicle.

Accordingly, the foldable vehicle of the present invention can change the wheelbase, and when the wheelbase decreases, the windshield part and the roof part are positioned inside the cabin part and the cabin part covers the inside of the vehicle, such that it is possible to the reduce the vertical space as well as the longitudinal space.

FIGS. 1 to 4 show the folding process. First, as the windshield part 400 is folded, as in FIG. 2, the roof part 600 is moved down inside the vehicle. When the windshield part 400 is folded, the windshield part 400 and the roof part 600 are folded at an acute angle with the joint of the windshield part 400 and the roof part 600 facing the rear cabin part 500.

Thereafter, as shown in FIG. 3, the rear cabin part 500 is turned forward and covers the windshield part 400 and the roof part 600 and the rear floor 200 is slid to overlap the front floor 100 by the rear wheels 210, such that the wheelbase shortens. A rear actuator 540 turns the rear cabin part 500 forward/backward. Further, a rear wheel driving unit operates the rear wheels 210, when the vehicle is folded, to slide the rear floor 200 forward under the front floor 100, thereby reducing the wheelbase.

Accordingly, when the vehicle is fully folded, as shown in FIG. 4, the longitudinal and vertical spaces are reduced. It is possible to unfold the vehicle by reversing this process.

On the other hand, as shown in FIG. 5, a front actuator 410 turns the windshield part 400 forward/backward. In detail, the front actuator 410 may be a linear actuator that has the lower end coupled to the front floor 100 and the upper end coupled to the windshield part 400, and turns the windshield part 400 by pushing or pulling it.

That is, there are provided the front actuator 410 turning the windshield part 400 forward/backward, the rear actuator 540 turning the rear cabin part 500 forward/backward, and the rear wheel driving unit operating the rear wheels 210, when the vehicle is folded, to slide the rear floor 200 forward under the front floor 100 so that the wheelbase reduces. Therefore, when the vehicle is folded, the windshield part 400 and the roof part 600 are pulled first down inside the vehicle by the front actuator 410 and then folded by the rear actuator 540 and the rear wheel driving unit. When the rear actuator 540 is operated, the windshield part 400 and the roof part 600 can be inserted into the passenger compartment inside the rear cabin part 500.

Since the rear actuator 540 and the rear wheel driving unit are simultaneously operated, the wheelbase can be shortened and the windshield part 400 and the roof part 600 can be fully inserted inside the rear cabin part 500. Accordingly, it is possible to shorten the time to fold the vehicle. Further, finally, the rear cabin part 500 can fully cover the inside of the vehicle in folding by coming in contact with the rear end of a hood of the vehicle.

The rear cabin part 500 may include a shield covering the passenger compartment, a first contact portion 501 that comes in close contact with the rear end of the hood 300, when the vehicle is folded, and a second contact portion that comes in close contact with the floor part F, when the vehicle is folded. Accordingly, as shown in FIG. 4, when the vehicle is fully folded, it is possible to prevent the inside of the vehicle from being contaminated by external factors and prevent the vehicle from being stolen.

In order to unfold the folded vehicle, reversely, the rear actuator and the rear wheel driving unit are operated first to turn the rear cabin part 500 backward so that the wheelbase increases, and then the front actuator 410 is operated to unfold the windshield part 400 and the roof part 600 outward.

Figure 6:
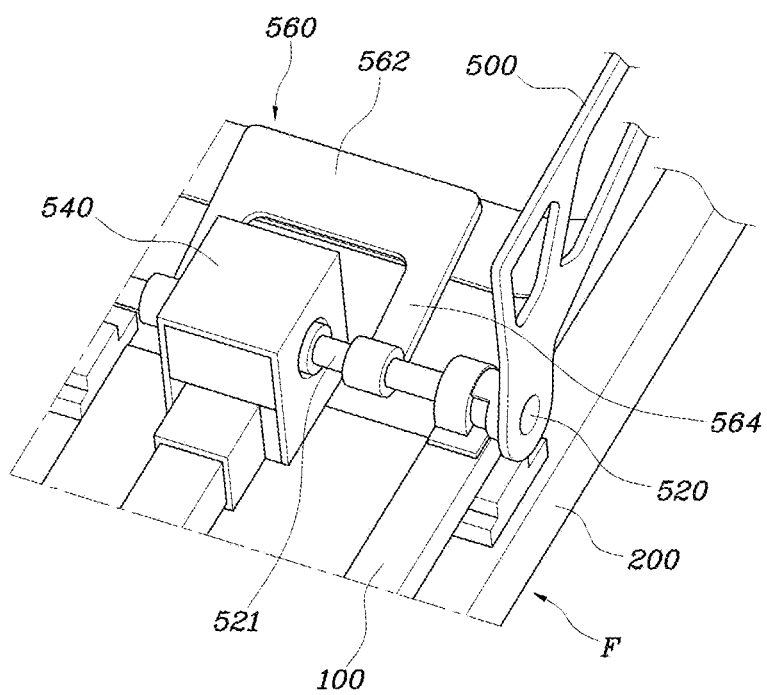
FIG. 6, FIG. 7 and FIG. 8 are views showing the operation structure of a rear cabin part of the foldable vehicle according to an exemplary embodiment of the present invention.
Figure 7:
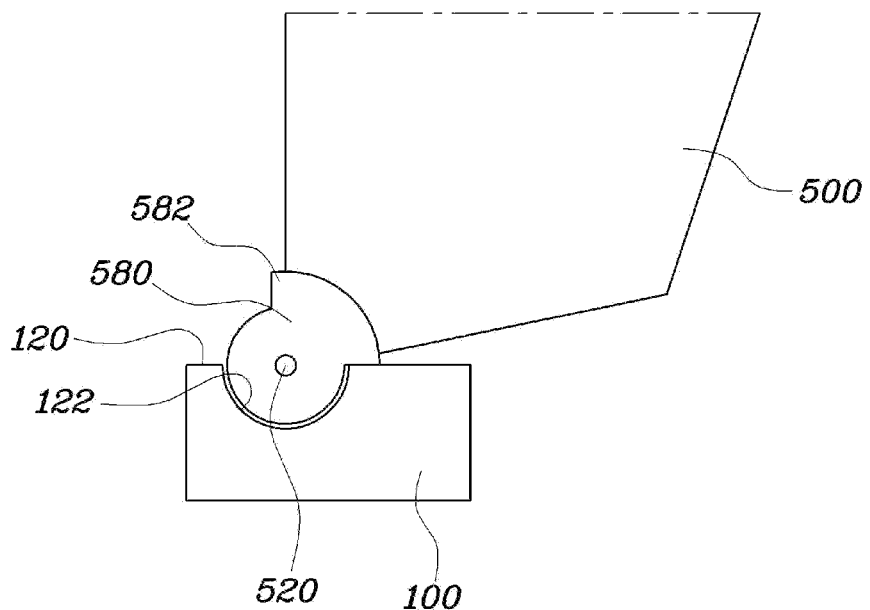
Figure 8:
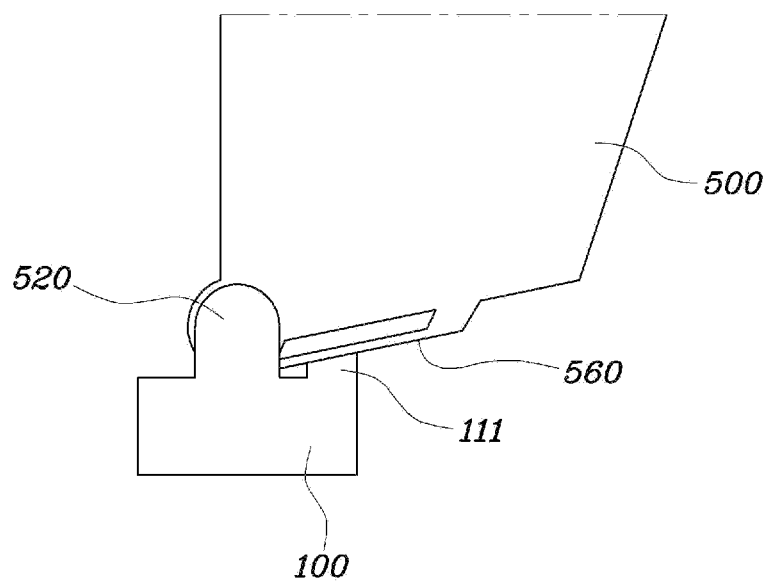
Figure 9:
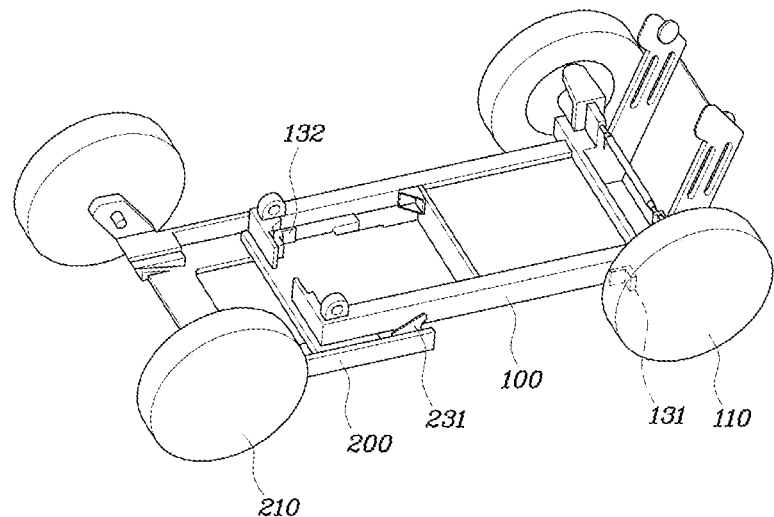
FIG. 9, FIG. 10, FIG. 11 and FIG. 12 are views showing the operation structure of a floor part of the foldable vehicle according to an exemplary embodiment of the present invention.
Figure 10:
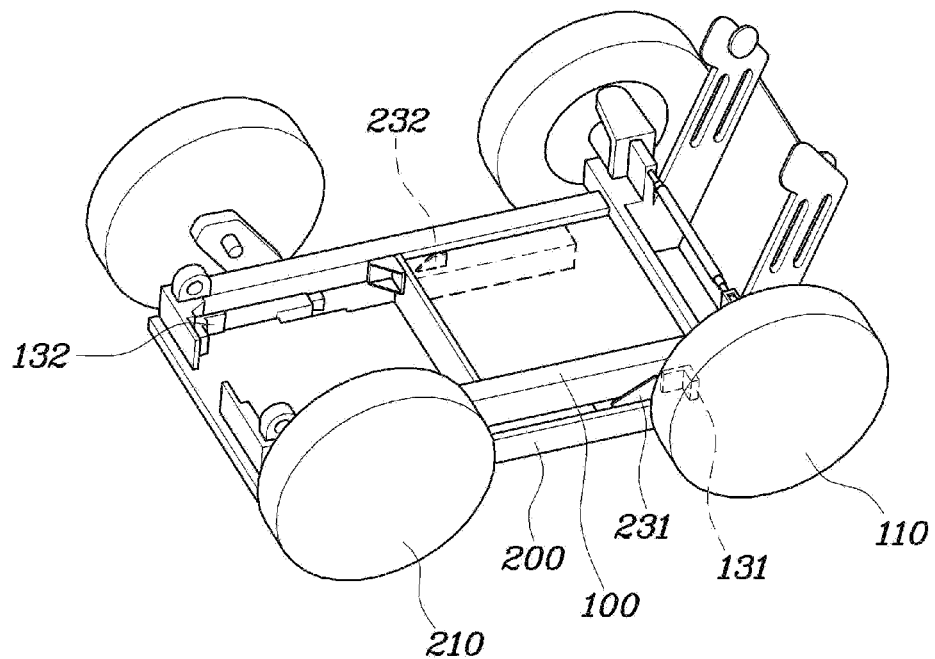
Figure 11:
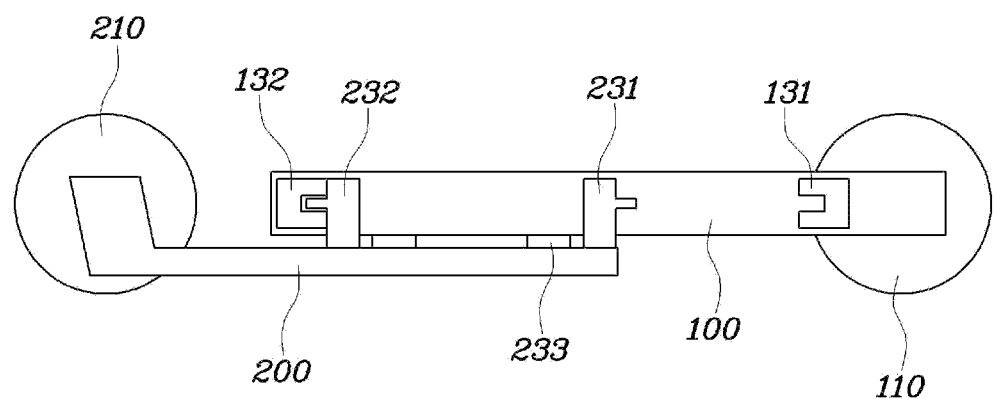
Figure 12:
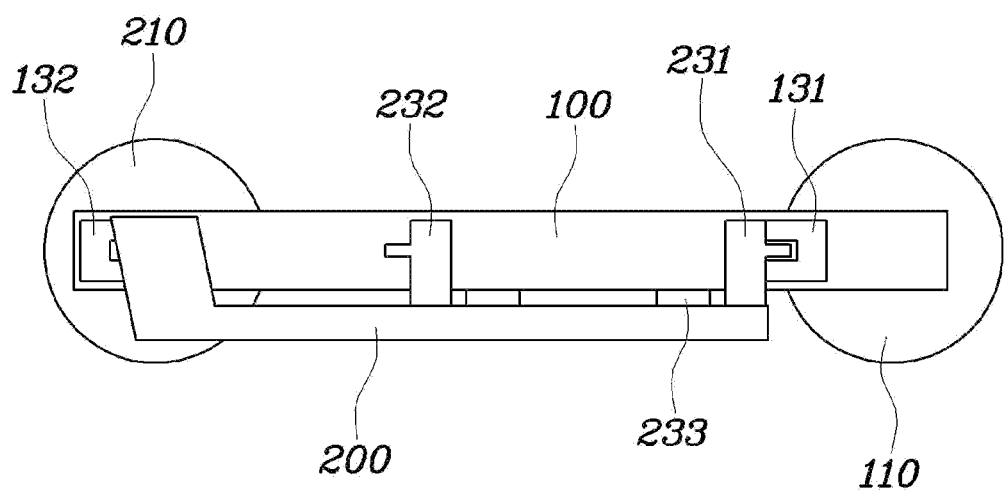

FIGS. 6 to 8 are views showing the operation of the rear cabin part of the foldable vehicle according to an exemplary embodiment of the present invention, in which the rear cabin part 500 is coupled to the front floor 100 through a hinge shaft 521.

A support portion 120 may be formed on the front floor 100, close to the hinge shaft 521, and a stopper 582 that comes in contact with the support portion 120 may be formed on the hinge shaft 521 of the rear cabin part 500. Accordingly, when the rear cabin part 500 fully turns to fold or unfold, it is supported, so a stable structure can be achieved.

In detail, the support portion 120 may be formed ahead of and behind the hinge shaft 521, on the front floor 100. Further, the stopper 582 may protrude forward and backward from the hinge shaft 521.

Therefore, when the vehicle is unfolded, the rear cabin part 500 can be supported on the front floor 100 with the rear support portion 120 and the rear stopper 582 in contact with each other, and when the vehicle is folded, the rear cabin part 500 can be supported on the front floor 100 with the front support portion 120 and the front stopper 582 in contact with each other.

A ring-shaped bearing member 580 is fitted on the hinge shaft 521, a seat 122 where the bearing member 580 is seated is formed between the support portions 120, and the stoppers 582 protrude outward on the bearing member 580. Accordingly, the bearing member 580 stably rotates in the seat 122, so that the hinge shaft 521 and the rear cabin part 500 can stably turn.

Further, since the stoppers 582 protrude outward on the bearing member 580, when the stoppers 582 are in contact with the support portions 120, the rear cabin part 500 cannot turn, and when the rear cabin part 500 is fully folded or unfolded, it is stably supported by the support portions 120.

On the other hand, as shown in FIGS. 6 and 8, a support panel 560 is formed on the bottom of the rear cabin part 500, behind the hinge shaft 521, and a support 111, which supports the support panel 560, when the rear cabin part 500 turns backward, is formed on the floor part F. Accordingly, the rear cabin part 500 has a double support structure.

In detail, the support panel 560 may include a support side 562 that comes in contact with the support 111 and bridges 564 that connect the support side 562 to the hinge shaft 521. The support 111 may protrude upward from the rear floor 200 and may have an inclined top that is brought in contact with the support panel 560, when the rear cabin part 500 is unfolded.

That is, when the rear cabin part 500 is fully unfolded, the support panel 560 is prevented from turning and supported by the support 111, with the support side 562 in surface contact with the support 111 at an angle, such that the rear cabin part 50 can be stably supported.

FIGS. 9 to 12 are views showing the operation structure of the floor part of the foldable vehicle according to an exemplary embodiment of the present invention. As shown in the figures, female holders 131 and 132 may be disposed at the front end and the rear end of the front floor 100, respectively, and male holders 231, 232, which are locked to the female holders 131 and 132, when the wheelbase increases or decreases, may be disposed on the rear floor 200.

This configuration is provided to keep the wheelbase without a change, when the vehicle is fully folded and unfolded to increase and decrease the wheelbase.

In detail, the front female holder 131 is disposed at the front end of a first side of the front floor 100 and can be coupled to the male holder 231, when the wheelbase decreases. The rear female holder 132 is disposed at the rear end of a second side of the front floor 100 and can be coupled to the male holder 232, when the wheelbase decreases. That is, when the vehicle is folded and unfolded, the floors are fixed by coupling of the male holders 231 and 232 and the female holders 131 and 132, and the holders can be coupled by various locks that are electronically controlled.

In particular, the male holders 231 and 232 may be disposed on both sides of the rear floor 200, respectively, at a predetermined distance from each other in the longitudinal direction of the vehicle. Accordingly, it is possible to adjust the variable range of the wheelbase by adjusting the distance between the male holders 231 and 232.

Sliding guides 233 that are coupled to the front floor 100 may be disposed on the rear floor 200, between the male holders 231 and 232. The sliding guides 233 protrude upward on the rear floor 200 and sliding rails that are fitted on the sliding guide 232 may be disposed on the bottom of the front floor 100. Accordingly, the front floor 100 and the rear floor 200 stably slide over and under each other and their movement ranges are restricted ahead of and behind the sliding guides 232, and they are fixed by the male holders 231 and 232 and the female holders 131 and 132 coupled to each other when the vehicle is fully folded and unfolded, such that the wheelbase is prevented from changing, when the vehicle is parked or running.

According to the foldable vehicle of the present invention described above, at the maximum, four vehicles can be parked in a space where one vehicle can be parked, so the optimum effect can be achieved in the downtown area.

Further, since local folding is possible in a narrow space, the wheelbase is shortened and the turning radius is decreased, so driving is easy.

In addition, the overall height is small, when the vehicle is parked, so the vehicle can be sufficiently parked in a space with a low roof For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A foldable vehicle comprising:
    a floor part including a front floor coupled with front wheels and a rear floor coupled with rear wheels, wherein the front floor and the rear floor increase or decrease a wheelbase of the vehicle by sliding over and under each other;
    a windshield part including a windshield and having a lower end hinged to a front of the front floor to turn forward or backward;
    a rear cabin part formed in a dome shape with a passenger compartment at a rear of the vehicle and having a lower end hinged to the floor part to turn forward or backward; and
    a roof part that is a link structure with a front end hinged to an upper end of the windshield part and a rear end hinged to an upper end of the rear cabin part,
    wherein the roof part is configured to be stowed inside the vehicle when the windshield part and the rear cabin part are folded inward, and is configured to be exposed to the outside to form a roof of the vehicle when the windshield part and the rear cabin part are unfolded outward.

2. The foldable vehicle of claim 1, further comprising a front actuator engaged to the windshield part to turn the windshield part forward or backward.

3. The foldable vehicle of claim 2, wherein the front actuator is a linear actuator having a lower end coupled to the front floor and an upper end coupled to the windshield part and turning the windshield part by pulling or pushing the windshield part.

4. The foldable vehicle of claim 1, wherein when the windshield part is folded, the windshield part and the roof part are folded at an acute angle with a joint of the windshield part and the roof part facing the rear cabin part.

5. The foldable vehicle of claim 1, further comprising a rear actuator engaged to the rear cabin part and turning the rear cabin part forward or backward.

6. The foldable vehicle of claim 1, further comprising a rear wheel driving unit operating the rear wheels so that the rear floor slides forward under the front floor to shorten the wheelbase, as the vehicle is folded.

7. The foldable vehicle of claim 1, further comprising:
    a front actuator engaged to the windshield part and turning the windshield part forward or backward;
    a rear actuator engaged to the rear cabin part and turning the rear cabin part forward or backward; and
    a rear wheel driving unit operating the rear wheels so that the rear floor slides forward under the front floor to shorten the wheel base, as the vehicle is folded,
    wherein when the vehicle is folded, the front actuator is operated first to pull the windshield part and the roof part down inside the vehicle and then the rear actuator and the rear wheel driving unit are operated to fold the windshield part and the roof part.

8. The foldable vehicle of claim 7, wherein when the rear actuator is operated, the windshield part and the roof part are inserted into the passenger compartment inside the rear cabin part.

9. The foldable vehicle of claim 8, wherein the rear actuator and the rear wheel driving unit are simultaneously operated, such that the wheelbase is shortened and the windshield part and the roof part are fully inserted inside the rear cabin part.

10. The foldable vehicle of claim 8, wherein the rear cabin part fully covers the inside of the vehicle in folding by coming in contact with a rear end of a hood of the vehicle.

11. The foldable vehicle of claim 10, wherein the rear cabin part has:

a shield covering the passenger compartment;

a first contact portion coming in close contact with the rear end of the hood, when the vehicle is folded; and a second contact portion coming in close contact with the floor part, when the vehicle is folded.

12. The foldable vehicle of claim 7, wherein when the vehicle that has been folded is unfolded, the rear actuator and the rear wheel driving unit are operated first to turn the rear cabin part backward so that the wheelbase increases, and then the front actuator is operated to unfold the windshield part and the roof part outward.

13. The foldable vehicle of claim 1, wherein the rear cabin part is coupled to the front floor through a hinge shaft, a support portion is formed on the front floor, close to the hinge shaft, and a stopper coming in contact with the support portion is formed on the hinge shaft of the rear cabin part.

14. The foldable vehicle of claim 13, wherein the support portion is formed ahead of and behind the hinge shaft, on the front floor.

15. The foldable vehicle of claim 14, wherein the stoppers protrude forward and backward from the hinge shaft.

16. The foldable vehicle of claim 15, wherein when the vehicle is unfolded, the rear cabin part is supported on the front floor with a rear support portion and the rear stopper being in contact with each other, and when the vehicle is folded, the rear cabin part is supported on the front floor with a front support portion and the front stopper being in contact with each other.

17. The foldable vehicle of claim 13, wherein a ring-shaped bearing member is fitted on the hinge shaft, a seat where the bearing member is seated is formed between support portions, and the stoppers protrude outward on the bearing member.

18. The foldable vehicle of claim 13, wherein a support panel is formed on a bottom of the rear cabin part, behind the hinge shaft, and a support, which supports the support panel, when the rear cabin part turns backward, is formed on the floor part.

19. The foldable vehicle of claim 18, wherein the support panel has:

a support side coming in contact with the support; and bridges connecting the support side to the hinge shaft.

20. The foldable vehicle of claim 18, wherein the support protrudes upward from the rear floor and has an inclined top that is brought in contact with the support panel, when the rear cabin part is unfolded.

21. The foldable vehicle of claim 1, wherein female holders are disposed at a front end and a rear end of the front floor, respectively, and male holders, which are locked to the female holders, when the wheelbase increases or decreases, are disposed on the rear floor.

22. The foldable vehicle of claim 21, wherein the front female holder is disposed at a front end of a first side of the front floor and coupled to one of the male holders, when the wheelbase decreases.

23. The foldable vehicle of claim 21, wherein the rear female holder is disposed at a rear end of a second side of the front floor and coupled to another of the male holders, when the wheelbase decreases.

24. The foldable vehicle of claim 21, wherein the male holders are disposed on both sides of the rear floor, respectively, at a predetermined distance from each other in a longitudinal direction of the vehicle.

25. The foldable vehicle of claim 24, wherein sliding guides coupled to the front floor are disposed on the rear floor, between the male holders.

26. The foldable vehicle of claim 25, wherein the sliding guides protrude upward on the rear floor and sliding rails fitted on the sliding guide are disposed on the bottom of the front floor.

* * * * *